United States Patent [19]

Iwata

[11] 4,310,785

[45] Jan. 12, 1982

[54] ELECTRONIC PHOTOGRAPHIC FLASH APPARATUS

[75] Inventor: Hiroshi Iwata, Nara, Japan

[73] Assignee: West Electric Company, Ltd., Osaka, Japan

[21] Appl. No.: 149,986

[22] Filed: May 15, 1980

[30] Foreign Application Priority Data

May 29, 1979 [JP] Japan .................................. 54-66482

[51] Int. Cl.³ ............................................ H05B 41/32
[52] U.S. Cl. ................................ 315/241 P; 315/171;
  315/173; 354/145
[58] Field of Search ........................ 315/159, 171–173,
  315/206, 223, 224, 241 P; 320/1; 354/32, 33,
  128, 145

[56] References Cited

U.S. PATENT DOCUMENTS

| 2,877,385 | 3/1959 | Rock ........................... 315/241 P X |
| 4,039,898 | 8/1977 | Iwata ............................... 315/241 P |
| 4,256,994 | 3/1981 | Ikawa ............................. 315/173 X |

FOREIGN PATENT DOCUMENTS 2351389 7/1977 Fed. Rep. of Germany ... 315/241 P

Primary Examiner—Eugene R. LaRoche
Attorney, Agent, or Firm—Cushman, Darby & Cushman

[57] ABSTRACT

In an electronic photographic flash apparatus comprising a DC-DC converter, a high tension capacitor, and a gas-discharge flash tube to produce a light flash by consuming electric energy stored in said high tension capacitor,
  the improvement is that the apparatus further comprising
  a low tension capacitor and a switching circuit which connects the low tension capacitor parallel to the DC low voltage source for charging therein at an off-state of the apparatus, and connects the low tension capacitor in series to the DC low voltage source in a subsequent stand-by period thereby to boost the operation of the DC-DC converter at an initial stage in the waiting time when the power switch is on, so as to quickly charge up the high tension capacitor.

10 Claims, 8 Drawing Figures

ELECTRONIC PHOTOGRAPHIC FLASH APPARATUS

BACKGROUND OF THE INVENTION

1. Field of the Invention

The present invention relates to an electronic photographic flash apparatus comprising a DC-DC converter by which a main capacitor is charged with a high tension energy to be fed to a gas-discharge tube, and particularly to an improved constitution provided with a measure to shorten charging time to the main capacitor.

2. Prior Art

A conventional electronic photographic flash apparatus usually takes a considerable seconds from a switching-on of the apparatus to a time when the apparatus becomes ready for flashing with necessary light intensity, and therefore, a first conventional measure that have been taken is closing the power switch sufficiently in advance of a photographing, thereby always charging the main capacitor full in order not to lose a chance of photographing.

A second measure taken for dissolving such inconvenience is a use of a circuit called as series control system wherein a series-connected electronic switching device controls the flashing time period in a manner to cease the flashing when emanated light reaches a necessary amount, thereby shortening the charging time period and also leaving the remaining energy in the main capacitor for the next flashing.

In the abovementioned first measure of switching the apparatus on sufficiently in advance to the instance of photographing leads to a waste of batteries since a DC-DC converter in the apparatus is uselessly working, and therefore the problem is that the batteries must be changed frequently to fresh ones. The second measure, that is the use of the series control system, still has a problem that, the charging-up time can be shortened only for the second flashing or subsequent ones and the charging time for the initial flashing can not be shortened.

Still other measure for shortening the charge-up time was proposed by an invention of the U.S. Pat. No. 4,039,898 or the German Pat. No. 2351389. The proposed apparatus uses a primary battery as a low voltage source and a plural number of secondary batteries, which are connected so as to be charged by the primary battery during waiting time period and then are connected in series each other when operating a DC-DC converter therewith to charge the main capacitor, and thereby providing a multiplied voltage to the DC-DC converter. Though this measure is useful in obtaining a large initial rush current and hence in shortening the initial charging-up time, this circuit has a problem that an ordinary DC-DC converter can not be used since a use of the ordinary DC-DC converter combined with such series-connected secondary batteries will make an over-charging with the rush charging rate to the main capacitor even after a completion of charging a necessary amount of energy.

SUMMARY OF THE INVENTION

The present invention is for providing an electronic photographic flash apparatus wherein, at the initial stage of the cource of charging a main capacitor, a large current is fed to a DC-DC converter and thereafter a moderate current is fed to the DC-DC converter, thereby enabling to shorten the charging time of the main capacitor.

The present invention enables use of fairly simple circuit.

DESCRIPTION OF THE PREFERRED EMBODIMENTS

An electronic photographic flash apparatus in accordance with the present invention comprises
a DC low voltage source,
a DC-DC converter for generating a DC high tension utilizing a DC low tension fed by said DC low voltage source,
a power switch which switches feeding of current from said DC low voltage source to said DC-DC converter,
a high tension capacitor for storing electric energy produced by said DC-DC converter, and
a gas-discharge flash tube for generating a light flash by consuming the electric energy stored in said high tension capacitor,
the improvement is that the apparatus further comprises:
a low tension capacitor to be charged by said DC low voltage source,
an inverse charging prevention device connected to said low tension capacitor,
a switching circuit interlocked with said power switch to attain a first state and a second state of connection of said low tension capacitor with respect to said DC low voltage source, respectively for off and on of said power switch,
said first state being a connection to charge said low tension capacitor by said DC low voltage source, and
said second state having a series connection of said low tension capacitor and said DC low voltage source each other connected to said DC-DC converter and also having a series connection of said DC low voltage source and said inverse charging prevention device connected to said DC-DC converter.

The invention is hereinafter elucidated with reference to the drawings which show preferred examples of the present invention.

Figure 1:
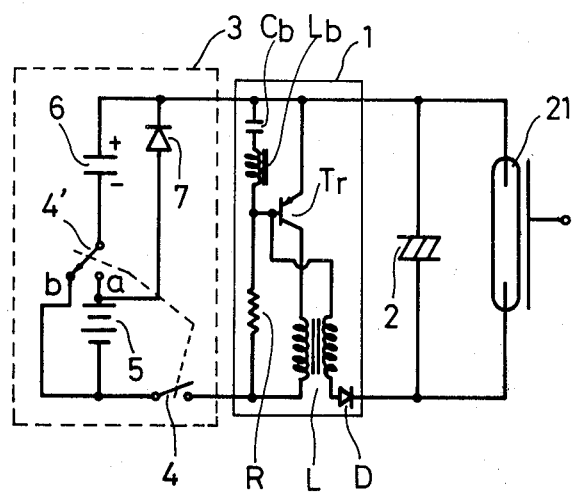
FIG. 1 is a circuit diagram of a first example of the present invention.

FIG. 1 is a circuit diagram of a first example of the present invention, wherein the apparatus comprises a low voltage source part 3, a known DC-DC converter part 1, a main capacitor or a high tension capacitor 2 and a gas-discharge flash tube 21. The low voltage source part 3 comprises a series connection of a power switch 4, batteries 5 as a low DC voltage source, and a diode 7 as an inverse charging prevention device. Although the DC-DC converter part 1 comprises such circuit elements as shown in FIG. 1, it can be composed of other circuit elements in a conventional manner. The series connection is connected across the positive and negative input terminals of the DC-DC converter part 1, across output terminals of which the high tension capacitor 2 and the gas-discharge flash tube 21 are connected in parallel. One end of a low tension capacitor 6 is connected to the cathode of the diode 7, which is connected to the positive input terminal of the DC-DC converter 1. The other end of the low tension capacitor 6 is connected through a contact "a" of a charge-over switch 4' to the positive terminal of the batteries 5 or alternatively through a contact "b" of the charge-over switch 4' to the negative terminal of the batteries 5. The DC-DC converter 1 comprises an oscillation transistor Tr, an oscillation transformer L, a rectifying diode D, a base-capacitor $C_b$, a base inductor $L_b$ and a resistor R. The power switch 4 and the change-over switch 4' are linked each other in a manner that the switch 4' is thrown to the contact "a" when the switch 4 is made "on" and to the contact "b" when "off".

At first, when the power switch 4 is in off state, the linked change-over switch 4' is on the side of the contact "b", and therefore the low tension capacitor 6 is charged up by a current through the diode 7 and the contact "b" from the batteries 5 in the polarity shown by the mark + and −. Once the capacitor 6 has been fully charged up, no more current flows out from the batteries 5, and therefore, the energy of the batteries 5 is not wasted.

Then, when the power switch 4 is turned to on state, the linked change-over switch 4' is turned to the side of the contact "a", and therefore, the low tension capacitor 6 and the batteries 5 are connected in series each other, thereby impressing a boosted voltage, which is twice as high as that of the batteries 5, is impressed across the input terminals of the DC-DC converter 1.

Figure 2:
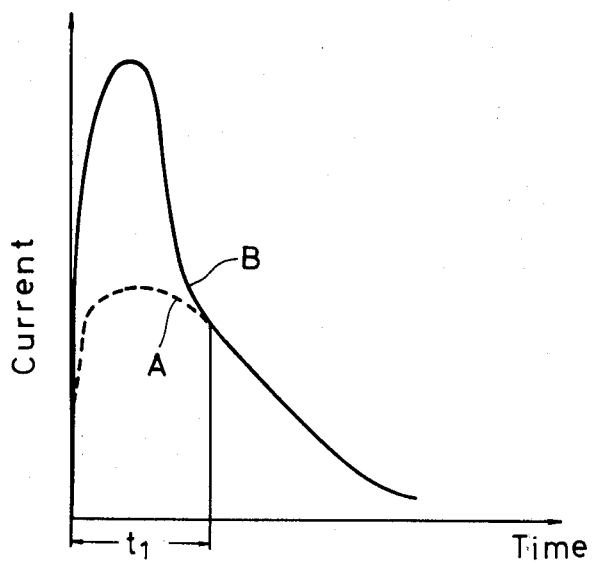
FIG. 2 is a current-time chart showing currents fed to a DC-DC converter of the example of the present invention (solid curve) and that of the conventional simple apparatus which does not include any rush charging measure.

Now, let us provide that, the turn ratio of the transformer L is designed in a manner that the DC-DC converter 1, when driven by voltage of the batteries 5 only, impress on the high tension capacitor 2 such a voltage as to charge it to the proper designed voltage. Then, as shown in FIG. 2, the charging current to the capacitor 2 for the operation with the twice high boosted voltage is about twice large at the initial stage as shown by the solid curve B, contrasted to the dotted curve A, which shows the current for the operation with the batteries voltage only. That is to say, by turning on the power switch 4 and simultaneously changing-over the contact of the switch 4', the voltage to be impressed across the converter 1 for the initial predetermined period is the sum of the voltage of the batteries 5 and the voltage of the low tension capacitor 6, which falls down as the charge in the capacitor 6 is lost. By selecting the capacitance of the low tension capacitor 6 larger, the time period $t_1$ (shown in FIG. 2) can be made longer.

Now, let us take a concrete example how the circuit in accordance with the present invention can shorten the time period for charging the high tension capacitor 2.

Provided that the capacitance $C_M$ of the high tension capacitor 2 is 200 μF and the voltage $V_2$ across both ends of the capacitor 2 needs to be charged up to 330 V. Then the charged energy is given by using the equation:

$$W = (\tfrac{1}{2}) C_M V_2^2 \qquad (1)$$

and the calculated necessary energy is 10.89 W·s.

On the other hand, in the conventional apparatus without the low voltage capacitor 6 let us provide that the voltage $V_1$ of the batteries 5 is 3 V by connecting in series two dry batteries each showing 1.5 V, that output current $I_1$ therefrom is 2 A, and that the DC-DC converter 1 has the conversion efficiency of 100%. Then, the time required for obtaining the abovementioned necessary energy of 10.89 W·s is given by the equation:

$$t = \frac{10.89}{I_1 \cdot V_1 \cdot \tfrac{1}{2}}, \qquad (2)$$

and the calculated time is 3.63 seconds. The constant "$\tfrac{1}{2}$" in the equation is inserted because only half of the energy produced by the DC-DC converter 1 is utilized in the charging of the capacitor 2 since the equal amount of energy to that given to the capacitor 2 is consumed by the resistive component of the DC-DC converter 1.

Then, in the low voltage source part 3 of the present invention, by providing the capacitance $C_6$ of the low tension capacitor 6 to be 2 F and the capacitor 6 is charged up to $V_6$, 3 V across both ends thereof, the energy stored in the low tension capacitor 6 is given by $(\tfrac{1}{2}) C_6 \cdot V_6^2$, and the calculated energy is 9 W·s. And then, the low tension capacitor 6 can supply half of the stored energy, that is 9 W·s × ($\tfrac{1}{2}$) = 4.5 W·s, to the high tension capacitor 2. As a result, the amount which the batteries 5 needs to supply is given by 10.89 W·s − 4.5 W·s = 6.39 W·s.

The time required to obtain such amount of energy from the battery 5 is calculated from the equation (2) to be 2.13 seconds, which is shortened by 1.5 seconds from 3.63 seconds of the conventional circuit.

For the abovementioned reason, by selecting the capacity of the low tension capacitor as large as possible to increase the amount of charge required for the high tension capacitor 2, the required charging time, namely the waiting time, can be made as short as possible. Thus, necessary value of the capacitor of the low tension capacitor 6 is several farads. For such a capacitor of a large capacitance, it is possible to employ recently developed wet-type electric double layer capacitors, which for example utilize electric double layer of large capacity and high breakdown voltage existing at the interface between an active carbon electrode and an organic electrolyte. With the use of such type of capacitors, such a large capacity as several farads is easily obtainable, and moreover the volume of the capacitor can be made satisfactorily small since such wet-type double layer capacitors have a large capacity of about 2 F/cm$^3$.

The diode 7 is for preventing charging into the low tension capacitor in inverse polarity. This is necessary to protect the low tension capacitor 6 from breaking down due to inverse charging over its inverse break down voltage, and also to enable supply of current from the batteries 5 to the DC-DC converter 1 after exhaustion of the charge in the low tension capacitor 6 and hence to assure efficient working of the DC-DC converter 1. That is to say, after the whole charge of the low tension capacitor 6 be discharged during supply of energy from the low voltage source part 3 to the DC-DC converter 1, the batteries 5 only supply the energy to the DC-DC converter 1. In this case, if the diode 7 is not provided, the energy is given through the low tension capacitor 6 to the DC-DC converter 1, and accordingly, the low tension capacitor 6 is charged in the inverse direction, and furthermore, a supply of DC current ceases thereafter and thereby stopping the operation of the DC-DC converter. In this example, by providing the diode 7 connected between the positive end of the batteries 5 and the positive input terminal of the DC-DC converter 1, the inverse charging in the low tension capacitor 6 remains only to the small voltage corresponding to the forward voltage drop in the diode 7 during the supply of energy from the batteries 5 to the DC-DC converter 1. Moreover, by the DC current supplied through the diode 7 to the DC-DC converter 1, the converter can continue to work after finishing of the boosted working during the time period $t_1$ shown in FIG. 2, and the current gradually decreases as the high tension capacitor 2 becomes charged and the charging current from the DC-DC converter to the high tension capacitor 2 decreases.

The charging operation to the low tension capacitor 6 is made as follows: When the flash apparatus is not used, the power switch 4 is turned off, and therefore, the change-over switch 4' is thrown on the "b" contact side. Accordingly, the low tension capacitor 6 is charged by the current from the batteries 5 and through the diode 7, and after a certain time period, the capacitor 6 is charged up to the voltage of the batteries 5. As mentioned above, by means of the provision of the diode 7 and the change-over switch 4', the capacitor 6 is charged up during the waiting time period, that is when the power switch is off. And thereafter, after the power switch 4 is made on and simultaneously the change-over switch 4' is turned to the "a" contact side, and therefore the doubled voltage, that is the sum of the voltages of the capacitor 6 and the batteries 5, is impressed on the DC-DC converter 1, during which the capacitor 6 discharges its energy to the DC-DC converter 1. The abovementioned voltage boosting effect by means of the energy in the capacitor 6 works to shorten the charging time period to charge the high tension capacitor 2. The abovementioned charge time shortening effect can be expected in the same manner for each turning-on of the power switch 4.

Since the apparatus of the present invention needs not uselessly make the DC-DC converter 1 always work, that is, working of the DC-DC converter 1 is limited to a short period immediately before, for example, 1–3 seconds before a shutter releasing, there is no waste of energy of the batteries.

Figure 3:
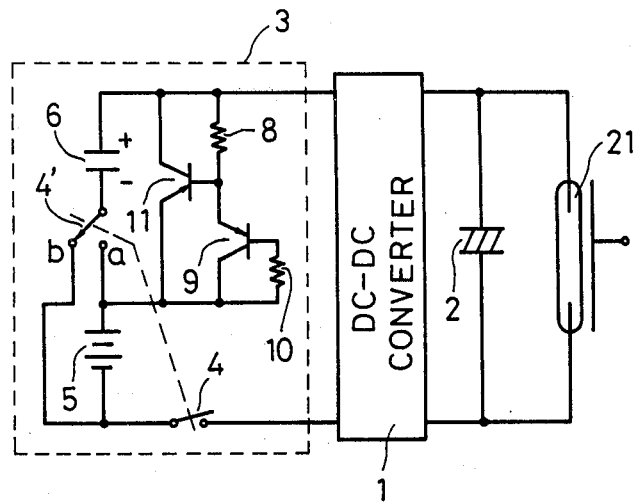
FIG. 3 to FIG. 8 are circuit diagrams of second to seventh examples embodying the present invention.

FIG. 3 is a circuit diagram of a second example, wherein a circuit comprising two bipolar transistors 9 and 11 is provided in place of the diode 7, and the corresponding parts of the circuit are shown by the same numerals as those of FIG. 1.

The operation of the apparatus of FIG. 3 is as follows: At the instant when the power switch 4 is made on and simultaneously the switch 4' is turned on the "a" contact side, the fully charged voltage across the low tension capacitor 6 is impressed across the series connection of a resister 8, the transistor 9 and the resister 10, and therefore, the transistor 9 becomes on, and accordingly the transistor 11 becomes off. In this state, the energy stored in the capacitor 6 is given to the DC-DC converter in the form of sum of the voltages of the capacitor 6 and the batteries 5. Then, as the energy stored in the capacitor 6 is discharged, the voltage across the capacitor 6 becomes low, and when the voltage becomes lower than the emitter-base threshold level of the transistor 9 the transistor 9 becomes off. Then, when the transistor 9 becomes off, the transistor 11 becomes on. When the transistor 11 becomes on, supply of energy to the DC-DC converter 1 is made from the batteries 5 through the transistor 11. And, since transistor 11 short-circuits the capacitor 6, there is substantially no fear that the capacitor 6 is charged inversely.

Then, when the power switch 4 is made off, and simultaneously the change-over switch 4' is turned to "b" contact, the low tension capacitor 6 is charged through the emitter-collector circuit of the transistor 11, which is in on-state since the transistor 9 is off and a voltage across the base and the collector is smaller than the threshold level of the base-collector voltage. And the low tension capacitor 6 is charged up to the voltage of the batteries 5.

In the example of FIG. 3, similarly to the example of FIG. 1, the inverse charging to the low tension capacitor 6 can be prevented, and after discharging of the energy in the capacitor 6 it is again charged by the batteries 5 for the energy supply to the DC-DC converter 1. This example can attain, similarly to the example of FIG. 1, shortening of the charging up of the high tension capacitor 2 after switching on of the power switch 4.

Figure 4:
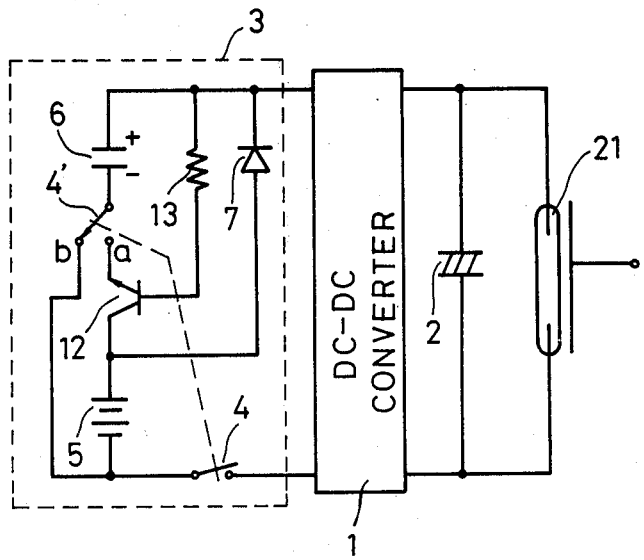

FIG. 4 is a circuit diagram of a third example, where a circuit includes an improvement in a DC low voltage source part 3, and the improvement is devised to prevent an inverse charging of the low tension capacitor 6 by a forward voltage drop in the diode 7. The corresponding numerals indicate the similar components as in FIG. 1. The improvement of FIG. 4 in comparison with FIG. 1 is the provision of a bipolar transistor 12 which is connected by the base through a resistor 13 to the positive end of the capacitor 6, by the emitter to the contact "a" of the change-over switch 4' and by the collector to the positive end of the batteries 5.

When turning the power switch 4 on, a base current is supplied from the capacitor 6 through a resistor 13 to the base of the transistor 12, and therefore, the transistor 12 is made on, and connects the capacitor 6 and the batteries 5 in series each other. Accordingly, a boosted energy is supplied from the series connection to the DC-DC converter 1. Thereafter, the charged energy of the polarity as mentioned in FIG. 4 is discharged to the DC-DC converter 1, and when the voltage in the capacitor 6 becomes lower than the base-emitter threshold level of the transistor 12, the transistor 12 becomes impossible to remain on, and hence turns off. Accordingly, the connection between the batteries 5 and the capacitor 6 is cut off, and thereafter the capacitor 6 is not charged by the batteries 5 and therefore an inverse charging to the capacitor 6 is completely prevented.

Figure 5:
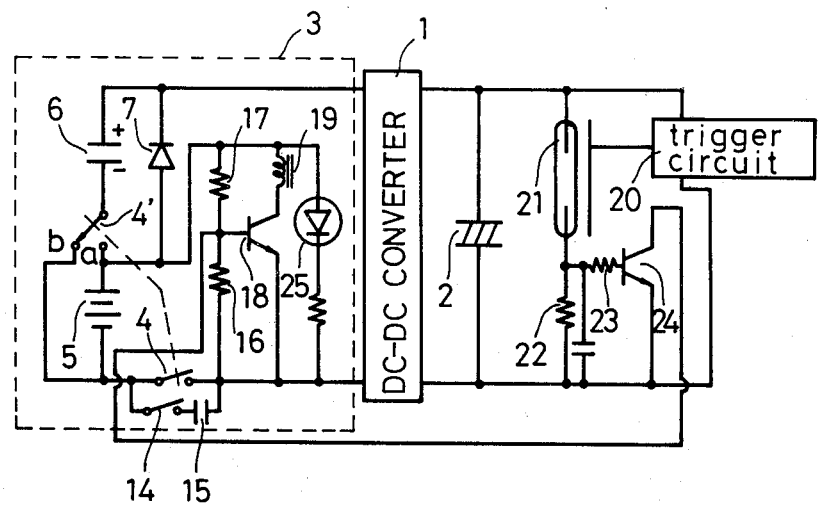

FIG. 5 is an electric circuit diagram of an electronic photographic flash apparatus in accordance with a fourth embodiment of the present invention. Circuit elements with reference numbers same as those for the parts in FIGS. 1, 3 and 4 represents similar ones as described in the abovementioned embodiments. The feature of this circuit is a provision of a relay 19 which controls a power switch 4 and a change-over switch 4' upon each flashing of a gas-discharge flash tube 21, thereby attaining an early starting of the re-charging of a low tension capacitor 6 and resultant shortening of time pitch between successive flashing. A circuit including the transistor 24 and a transistor 18 is for driving the relay 19 upon detection of the discharging in the flash tube 21, and a circuit including a switch 14 and a capacitor 15 is for making the transistor 18 on thereby to make the power switch on. When the electronic photographic flash apparatus is set in operation by closing a switch 14 for a predetermined time period, a charge current flows through resistors 16 and 17 from batteries 5 until a capacitor 15 is fully charged.

As results of the charge current and a voltage drop in the resistor 16, a base potential is produced between the base and the emitter of a transistor 18 thus turning on the transistor 18 and actuating a relay 19 connected in series to the collector thereof. The relay 19 is provided to control on- and off-operation of a power switch 4 and a change-over switch 4' interlocked with each other. When the relay 19 is actuated, the switch 4 is automatically closed and at the same time the change-over switch 4' is changed over to the contact "a". Then, an electric energy is supplied from the batteries 5 and a low tension capacitor 6 to a DC-DC converter 1, as described above.

When the power switch 4 is closed by the actuation of the relay 19, the energy supplied from the batteries 5 is directly made through the power switch 4, and no more through the switch 14 and the capacitor 15, but the transistor 18 keeps on-state, and thus the relay 19 is at the actuation state. When the photographer pushes the shutter button after a charge voltage of a high tension capacitor 2 reaches a predetermined voltage, a known trigger circuit 20 is actuated synchronously with the synchronizing contact operation of the camera thereby to obtain flashed light from a flash tube 21.

At the time when the flash tube 21 is flashed, the charges stored in the high tension capacitor 2 are discharged through the flash tube 21 and the resistor 22 thereby producing a voltage drop across the resistor 22. This voltage drop causes voltage impression between the base and the emitter of a transistor 24 through a resistor 23. Accordingly, the transistor 24 is turned on. The transistors 18 and 24 have such electric parameters (in the circuit diagram of FIG. 5) that the transistor 18 is turned off when the transistor 24 is turned on thereby short-circuiting the base and the emitter of the transistor 18. When the transistor 18 is turned off, the current supply to the relay 19 is cut off thereby terminating the energization of the relay 19.

When the energization of the relay 19 is terminated, the interlocked power switch 4 is automatically turned off and the change-over switch 4' is similarly changed over to the contact "b". Accordingly, the current supply from the batteries 5 to the base of the transistor 18 is terminated completely, and thus the relay 19 is further at the deenergized state. This means that the circuit operation is turned from the state of supplying the electric energy to the DC-DC converter 1 to the state of charging the low tension capacitor 6.

In the embodiment of FIG. 5, the operation of the electronic photographic flash apparatus is controlled by a switch 14 such as a push-button switch. Such a push-button is usually disposed at the camera body where the photographer have easy access to it. At the operation start of the electronic photographic flash apparatus, the push-button is pushed down by the photographer for a moment, and then an indication device 25 is lit to indicate that the energy supply to the DC-DC converter 1 is being made. In other words, after the power switch 4 is turned on, the indication device 25 lights up, and when the power switch 4 is turned off after the flashing operation, the indication device 25 is put off.

As described above, the electronic photographic flash apparatus in accordance with the fourth embodiment of the present invention shown in FIG. 5 has a feature that after the photographing by the flashed light from the gas-discharge flash tube 21 the low voltage source part 3 surely operates so as to charge the low tension capacitor 6. Therefore, this embodiment provides the electronic photographic flash apparatus where the charging of the low tension capacitor 6 is accurately controlled after every flashing photographing.

Figure 6:
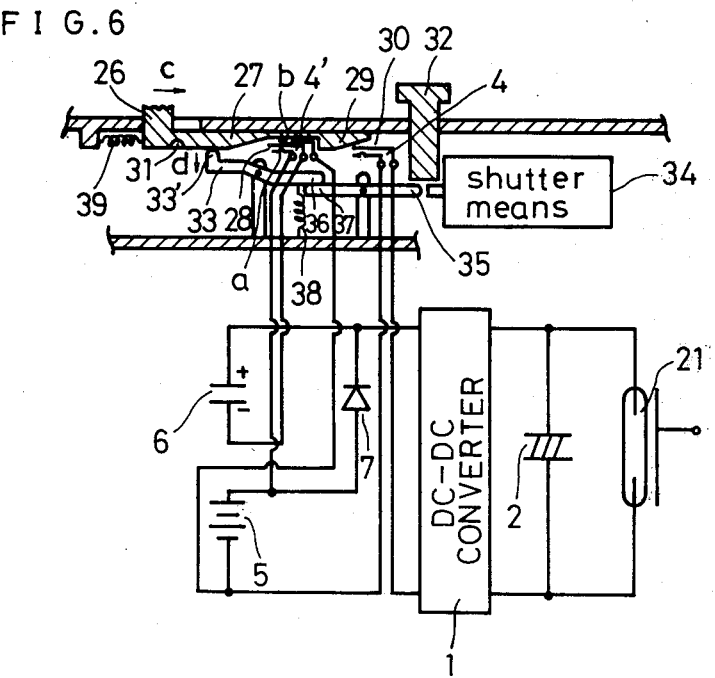

FIG. 6 is a view showing a cross-sectional view of principal control parts together with an electric circuit diagram of an electronic photographic flash apparatus. The electric circuit diagram corresponds to the one previously shown in FIG. 1. A fifth embodiment of the present invention shown in FIG. 6 employs several mechanical means in order to obtain a similar control operation to that of the fourth embodiment. That is, the fifth embodiment provides an electronic photographic flash apparatus encased in a camera body, where the power switch 4 and the interlocked change-over switch 4' in the first embodiment are turned on and off by use of a mechanical construction.

The mechanical means of FIG. 6 work in the following manner. When the photographer intends to photograph with the flashed light, a switch knob 26 is pushed by the photographer in a direction indicated by an arrow "c". Then, a tapered part 27 pushes down a contact metal 28 of a change-over switch 4' so as to be in contact with a contact terminal "a", while another tapered part 29 pushes down a contact metal 30 of a power switch 4 thereby closing the power switch 4. Thus, the circuit begins the energy supply to a DC-DC converter 1 as described above for the first embodiment.

When the switch knob 26 is pushed rightwards as described above, a groove 31 provided at the switch knob 26 and a protrusion 33' at the tip of a stopping means 33 engage with each other. Thus, the switch knob 26 can be positioned at the left side position against the elastic force of a spring 39, and the power switch 4 and the change-over switch 4' are continuously closed. Thereafter, when the photographer pushes down a shutter button 32 at a state that a high tension capacitor 2 is charged to at least a predetermined charge voltage, a known shutter means 34 is actuated and at the same time the right side tip of a bar 35 is pushed down thereby rotating the bar 35 clockwise. Accordingly, the left side tip 37 of the bar 35 and the right side tip 36 of the stopping means 33 are pushed upwards against the elastic force of a spring 38. The protrusion 33' at a stopping means 33 is therefore pushed down as indicated by an arrow "d", and is released from the engagement with the groove 31. Then, the switch knob 26 is moved leftwards by the elastic force of the spring 39 and goes back to the original position as shown in FIG. 6. Accordingly, the power switch 4 is turned off and the contact metal 28 of the change-over switch 4' contact a contact terminal "b". This means that the electric circuit operates so as to charge the low tension capacitor 6.

The abovementioned fifth embodiment provides the electronic photographic flash apparatus where the supplying of the electric energy to the DC-DC converter 1 is started by the manual operation of the switch knob 26 and thereafter the low tension capacitor 6 is charged after the shutter button 32 is pushed down. Therefore, this electronic photographic flash apparatus has distinctive features that the charging time of the high tension capacitor 2 is shortened and further that the electric circuit operates so as to stop supply of energy to the DC-DC converter 1 but start charging of the low tension capacitor 6 immediately after the photographing.

This means, by dispensing with useless supply of energy to the DC-DC converter 1 from the batteries 5, the power consumption of the batteries 5 can be minimized.

Figure 7:
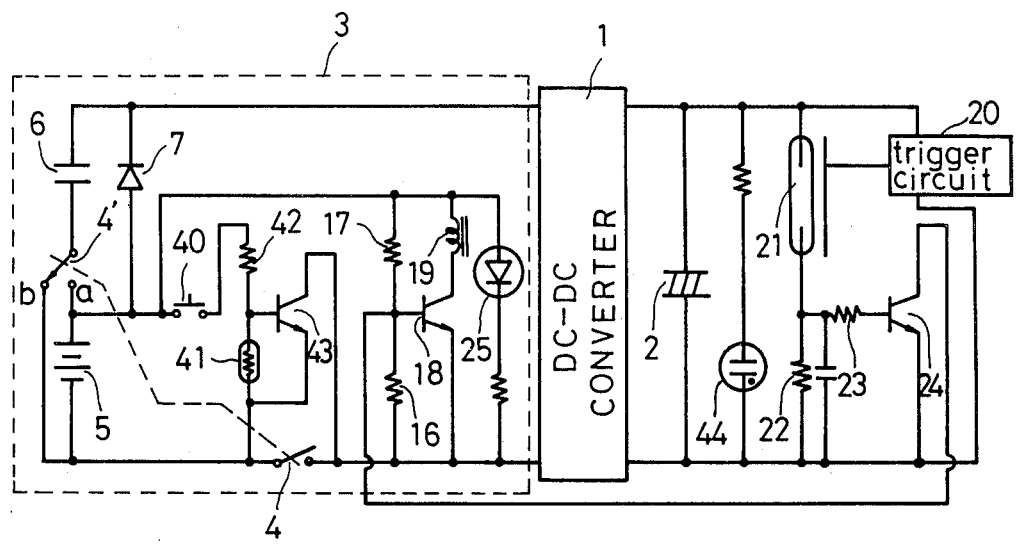

FIG. 7 is an electric circuit diagram of an electronic photographic flash apparatus in accordance with a sixth embodiment of the present invention. The sixth embodiment provides still further modified circuit operation that the charging of a high tension capacitor 2 is automatically started when the photographer intends to take a photograph under a condition in which the object brightness is insufficient for the photographing without the flashed light. The circuit operation is explained below by referring to FIG. 7. The electric circuit of FIG. 7 is principally based on that of the fourth embodiment in FIG. 5. Electric circuit elements with the reference numbers correspond to those with the same numbers in FIG. 5.

In the photographing, a self-returning switch 40, which is made to return to an original state by itself, is turned on for a moment, thereby a current supply is made to a photosensitive device 41 and a resistor 42. Accordingly, in case that the object brightness is insufficient for the photographing without the flashed light, a resistance of the photosensitive device 41 becomes high, causing a voltage drop therethrough which is sufficient to turn on a transistor 43. As shown in FIG. 7, the transistor 43 is connected parallel to a power switch 4. Thus, this turning-on of the transistor 43 makes almost identical effect to the circuit state that the power switch 4 is closed. Therefore, a current flows through resistors 16 and 17. This circuit operation is similar to the closing operation of the switch 14 in FIG. 5. Accordingly, a transistor 18 is turned on and a relay 19 is actuated thereby to close the power switch 4 and actuates a change-over switch 4' to the side of a contact "a". Thereafter, similar circuit operation is obtained like the case of the fourth embodiment in FIG. 5. After the photographing with the flashed light, the circuit operation is automatically turned to the operation mode of charging a low tension capacitor 6.

On the other hand, in case that the object brightness is sufficient for the photographing without the flashed light, a resistance of the photosensitive device 41 is low, thereby causing a voltage drop therethrough which is insufficient to turn on the transistor 43. Thus, the transistor 43 is not turned on and the transistor 18 does not turn on. Accordingly, the relay 19 is not actuated under this photographing condition, and the power switch 4 is not closed, either, and the high tension capacitor 2 is not charged. It is therefore natural that the photographing is made not accompanied with the flash light when the subject brightness is sufficient.

The operation of an indication device 25 is analyzed below. The indication device 25 in the circuit of the fourth embodiment of FIG. 5 is for indication of the circuit operation modes, in a manner that the indication device 25 lights up while the high tension capacitor 2 is charged up, and it goes out when the low tension capacitor 6 is charged up. Besides, the indication device 26 in the sixth embodiment of FIG. 7 can inform the photographer the condition of the object brightness, since the charging operation of the high tension capacitor 2 and the low tension capacitor 6 is further controlled by the object brightness. That is, the indication device 25 lights up when the subject brightness is insufficient for the photographing without the flash light, and it does not light up when the object brightness is sufficient.

Another indication device 44 in FIG. 7 is used to indicate whether the high tension capacitor 2 is charged. The charging operation of the high tension capacitor 2 is informed to the photographer by the lighting up of the indication device 25, and besides the completion of the charging in the high tension capacitor 2 is informed by lighting of the device 44.

As described above, the electric circuit of FIG. 7 is devised by modifying the circuit of the fourth embodiment in FIG. 5 in a manner that the operation of the switch 14 in FIG. 5 is controlled by the subject brightness. In a word, the sixth embodiment provides an electronic photographic flash apparatus where the power switch 4 is turned on and the high tension capacitor 2 is charged when the subject brightness is insufficient.

Figure 8:
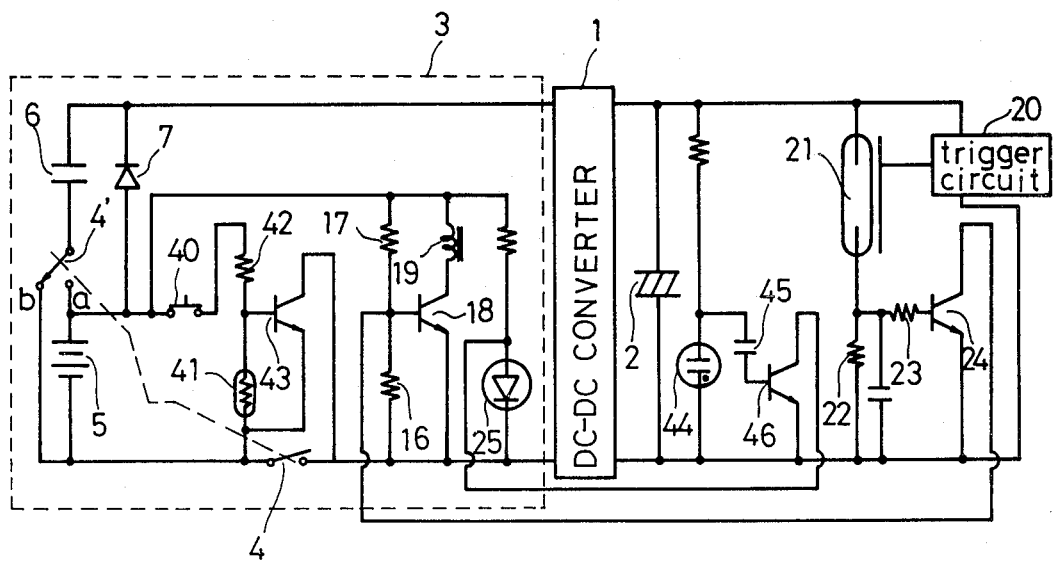

FIG. 8 is an electric circuit diagram of an electronic photographic flash device in accordance with a seventh embodiment of the present invention. The indication operation of the two indication devices 25 and 44 in the sixth embodiment is further modified in this embodiment. The indication operation of an indication device 25 is controlled by the operation of a detection device such as a semiconductor switching device to detect the state when an indication device 44 lights up or a high tension capacitor 2 is sufficiently charged up. The indication device 25 of FIG. 8 continuously lights up when the subject brightness is insufficient and the energy supply is made to the DC-DC converter 1, and further it begins blinking when the high tension capacitor 2 is sufficiently charged.

The circuit operation in the circuit of FIG. 8 is described below. Since a capacitor 45 and a transistor 46 are provided in the circuit as shown in FIG. 8, the capacitor 45 is alternatively charged and discharged after the indication device 44 lights up. In other words, a blocking oscillation is started by the indication device 44 and the capacitor 45, and the transistor 46 is intermittently turned on responding to the blocking oscillation. Since the collector and the emitter of the transistor 46 are connected across the both terminals of the indication device 25, the indication device 25 is intermittently short-circuited when the transistor 46 is intermittently turned on. This means that the indication device 25 begins blinking once the high tension capacitor 2 is sufficiently charged up. Accordingly, the indication device 25 can indicate more operation modes than the case of the sixth embodiment in FIG. 7.

If the electronic photographic flash apparatus is further modified in such a manner that the switch 40 in FIG. 7 or FIG. 8 is interlocked with a shutter button so as to close the switch 40 before the shutter button is completely pushed down, this modification is naturally quite advantageous when the electronic photographic flash apparatus embodying the present invention is assembled in the camera body.

In conclusion, the present invention can provide the electronic photographic flash apparatus with the advantages that the charging time of the high tension capacitor is shortened once the power switch is on.

What is claimed is:

1. In an electronic photographic flash apparatus comprising
   a DC low voltage source,
   a DC-DC converter for generating a DC high tension utilizing a DC low tension fed by said DC low voltage source, a power switch which switches feeding of current from said DC low voltage source to said DC-DC converter, a high tension capacitor for storing electric energy produced by said DC-DC converter, and a gas-discharge flash tube for generating a light flash by consuming the electric energy stored in said high tension capacitor, the improvement is that the apparatus further comprises:

a low tension capacitor to be charged by said DC low voltage source, an inverse charging prevention device connected to said low tension capacitor, a switching circuit interlocked with said power switch to attain a first state and a second state of connection of said low tension capacitor with respect to said DC low voltage source, respectively for off and on of said power switch, said first state being a connection to charge said low tension capacitor by said DC low voltage source, and said second state having a series connection of said low tension capacitor and said DC low voltage source each other connected to said DC-DC converter and also having a series connection of said DC low voltage source and said inverse charging prevention device connected to said DC-DC converter.

2. An electronic photographic flash apparatus in accordance with claim 1, wherein said switching circuit is a change-over switch which has a moving contact connected to one end of said low tension capacitor, a first fixed contact connected to one end of said DC low voltage source and a second fixed contact connected to the other end of said DC low voltage source, said moving contact being in contact with said first fixed contact in said first state and said second fixed contact in said second state, respectively.

3. An electronic photographic flash apparatus in accordance with claim 2, wherein said low tension capacitor is connected by said one end thereof to said moving contact and by the other end thereof to said DC-DC converter and through said inverse charging prevention device to said the other end of said DC low voltage source, so that in said first state said low tension capacitor is connected across said DC low voltage source through said first fixed contact and through said inverse charging prevention device and in said second state said low tension capacitor is connected in series to said DC low voltage source through said second fixed contact.

4. An electronic photographic flash apparatus in accordance with claim 1, wherein said inverse charging prevention device is a diode.

5. An electronic photographic flash apparatus in accordance with claim 1, wherein said inverse charging prevention device comprises a first switching device which becomes in conductive state in said first state by means of voltage of said DC low voltage source and a second switching device which becomes in conductive state in said second state by means of a voltage of said low tension capacitor thereby to turn said first switching device off.

6. An electronic photographic flash apparatus in accordance with claim 1, wherein said switching circuit is a change-over switch which has a moving contact connected to one end of said low tension capacitor, a first fixed contact connected to one end of said DC low voltage source and a second fixed contact, said inverse charging prevention device comprises a diode connected between one end of said DC low voltage source and said DC-DC converter and further comprises a transistor connected by the base to said DC-DC converter, by the emitter to said second fixed contact and by the collector to said one end of said DC low voltage source.

7. An electronic photographic flash apparatus in accordance with claim 1, which further comprises a relay to drive said power switch and said change-over switch, an operating switch, a first switching device which controls operation of said relay responding to the operation of said operating switch, a second switching device which becomes on upon detection of a discharge in said gas-discharge flash tube and hence turns said first switching device off, and a light emitting indication device connected across both ends of said DC low voltage source in series to said power switch 4.

8. An electronic photographic flash apparatus in accordance with claim 7, which further comprises a manual operation knob for changing the circuit operation from said first state to said second state, said operation knob having a springy means for restoring said knob to the original state, a stopper means for holding said manual operation knob in said second state of the circuit operation, and a releasing means which is interlocked with a shutter button of a camera and said stopper means in a manner to release said holding of said stopper means by means of said springy member upon pushing of said shutter button, thereby allowing said knob to restore to said original state.

9. An electronic photographic flash apparatus in accordance with claim 7, which further comprises a brightness detecting circuit for measuring brightness of a photographic object, a third switching device which becomes conductive when brightness measured by said brightness detecting circuit is below a predetermined level and turns the circuit operation into said second state thereby turning said first switching device on.

10. An electronic photographic flash apparatus in accordance with claim 7, which further comprises an oscillator connected to said high tension capacitor thereby to make oscillation when a voltage across said high tension capacitor reaches a predetermined level and also connected to said light emitting indication device in a manner to control lighting thereof, thereby to modulate lighting of said light emitting indication device when said voltage reaches said predetermined level.

* * * * *